United States Patent
Ishizuka (10) Patent No.: US 7,884,966 B2
(45) Date of Patent: Feb. 8, 2011

(54) IMAGE PROCESSING APPARATUS, SYSTEM, METHOD AND COMPUTER-READABLE MEDIUM

(75) Inventor: Ryuichi Ishizuka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 418 days.

(21) Appl. No.: 12/114,017

(22) Filed: May 2, 2008

(65) Prior Publication Data

US 2009/0046308 A1 Feb. 19, 2009

(30) Foreign Application Priority Data

Aug. 14, 2007 (JP) .............................. 2007-211496

(51) Int. Cl.
*H04N 1/60* (2006.01)
(52) U.S. Cl. .................. 358/1.9; 358/518; 358/520; 382/162; 382/167
(58) Field of Classification Search ................. 358/1.9, 358/518, 520; 382/162, 167
See application file for complete search history.

(56) References Cited

U.S. PATENT DOCUMENTS

| | | | |
|---|---|---|---|
| 6,646,763 B1 * | 11/2003 | Estrada ........................ | 358/1.9 |
| 7,304,767 B2 * | 12/2007 | Sasaki et al. ................. | 358/1.9 |
| 2003/0072018 A1 * | 4/2003 | Sasaki et al. ................. | 358/1.9 |
| 2003/0156120 A1 | 8/2003 | Sasanuma | |
| 2006/0061614 A1 | 3/2006 | Kodama et al. | |
| 2009/0073474 A1 * | 3/2009 | Saito et al. ................... | 358/1.9 |

FOREIGN PATENT DOCUMENTS

| | | |
|---|---|---|
| JP | 10294879 | 11/1998 |
| JP | 2001346054 | 12/2001 |
| JP | 2002027269 | 1/2002 |
| JP | 2002166602 | 6/2002 |
| JP | 2002281332 | 9/2002 |
| JP | 2003125225 | 4/2003 |
| JP | 2003312061 | 11/2003 |
| JP | 2006088425 | 4/2006 |

OTHER PUBLICATIONS

Office Action issued in connection with JP Application 2007-211496; mailed Aug. 11, 2009 and English translation excerpt.

* cited by examiner

*Primary Examiner*—Kimberly A Williams
(74) *Attorney, Agent, or Firm*—Gauthier & Connors LLP (57) ABSTRACT

There is provided an image processing apparatus that includes a conversion unit that performs color conversion of an input image by employing correlation information denoting color coordinates of grid points in an input color space and color coordinates corresponding to those grid points in an output color space; a first adjustment processing unit that performs first adjustment processing with respect to an image output from the conversion unit; a calculation unit that calculates a total color material amount corresponding to each of the grid points based on the color coordinates of the grid points in the output color space denoted by the correlation information; and a judgment unit that judges whether or not the first adjustment processing is to be applied to an image output from the conversion unit based on a comparison between the total color material amount corresponding to each grid point and the limit value.

13 Claims, 9 Drawing Sheets

IMAGE PROCESSING APPARATUS, SYSTEM, METHOD AND COMPUTER-READABLE MEDIUM

CROSS-REFERENCE TO RELATED APPLICATIONS

This application is based on and claims priority under 35 USC 119 from Japanese Patent Application No. 2007-211496, filed on Aug. 14, 2007.

BACKGROUND

1. Technical Field

The present invention relates to an image processing apparatus, system, method and computer-readable medium.

2. Related Art

In an image processing apparatus that forms an image on a medium by an electrophotographic method, it is known that, when the processing is performed using toner in an amount exceeding the appropriate amount, image degradation may occur due to transfer and fusing defects, and in some cases malfunctions in the apparatus itself may occur. Accordingly, some electrophotographic image processing apparatuses are provided with a function of automatically correcting output image data so as to maintain the total amount of toner used at or below a threshold value. Such automatic correction processing for limiting the amount of color material such as toner typically employs the scheme of under color removal (UCR). This type of automatic correction processing is performed with respect to an image that has been subjected to color conversion.

SUMMARY

According to an aspect of the present invention, there is provided an image processing apparatus including a conversion unit that performs color conversion of an input image by employing correlation information denoting color coordinates of grid points in an input color space and color coordinates corresponding to those grid points in an output color space and by performing interpolation based on the correlation information regarding color coordinates for points other than the grid points; a first adjustment processing unit that performs first adjustment processing with respect to an image output from the conversion unit so as to satisfy a limit value regarding a total color material amount; a calculation unit that calculates a total color material amount corresponding to each of the grid points based on the color coordinates of the grid points in the output color space denoted by the correlation information; and a judgment unit that judges whether or not the first adjustment processing is to be applied to an image output from the conversion unit based on a comparison between the total color material amount corresponding to each grid point calculated by the calculation unit and the limit value.

BRIEF DESCRIPTION OF THE DRAWINGS

Exemplary embodiment(s) of the present invention will be described based on the following figures, wherein.

DETAILED DESCRIPTION

The image processing apparatus explained below includes a conversion unit that performs color conversion of an input image by employing correlation information denoting color coordinates of grid points in an input color space and color coordinates corresponding to those grid points in an output color space and by performing interpolation based on the correlation information regarding color coordinates for points other than the grid points; a first adjustment processing unit that performs first adjustment processing with respect to an image output from the conversion unit so as to satisfy a limit value regarding a total color material amount; a calculation unit that calculates a total color material amount corresponding to each of the grid points based on the color coordinates of the grid points in the output color space denoted by the correlation information; and a judgment unit that judges whether or not the first adjustment processing is to be applied to an image output from the conversion unit, based on a comparison between the total color material amount corresponding to each grid point calculated by the calculation unit and the limit value.

The image processing apparatus as referred to herein may be, for example, a print apparatus (such as a printer or a copier) that prints an image on a physical medium such as a paper sheet, or an apparatus such as a print server or a print controller that supplies to a print apparatus image data of a target to be printed. In the former case, an output provided by the image processing apparatus is a print output of an image onto a physical medium, whereas, in the latter case, an output provided by the image processing apparatus is an output of image data to a print apparatus via a communication path such as a network or a communication cable. Further, a color material is a material for forming an image on a physical medium, and may be, for example, a toner used in an electrophotographic method (xerography) or an ink used in an inkjet method.

Figure 1:
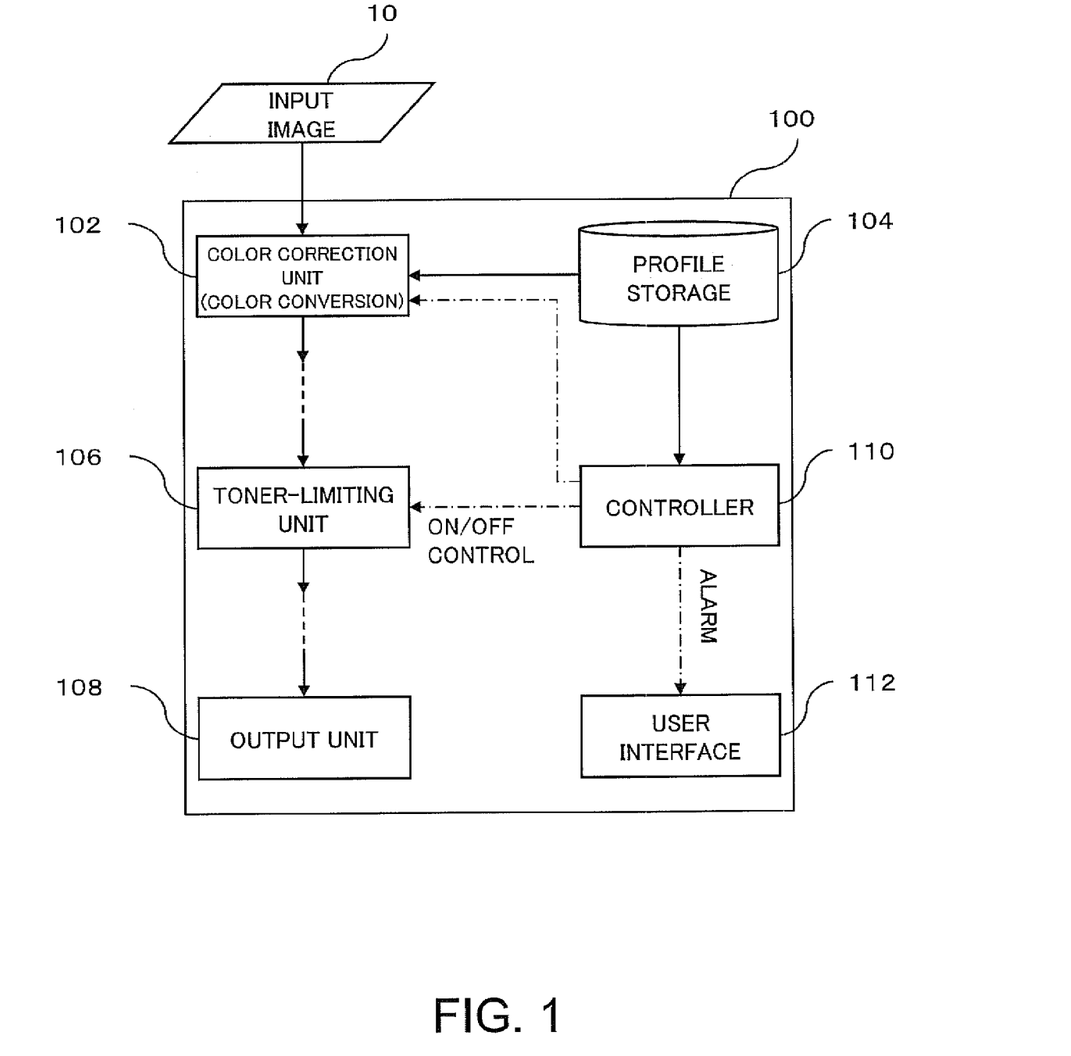
FIG. 1 is a functional block diagram showing an example image processing apparatus according to an exemplary embodiment of the present invention.

FIG. 1 illustrates an example of such an image processing apparatus. The exemplary image processing apparatus 100 includes a color correction unit 102, a profile storage 104, a toner-limiting unit 106, an output unit 108, a controller 110, and a user interface 112.

The image processing apparatus 100 performs processing for supplying a print output of an input image 10. The image processing apparatus 100 itself may supply the print output, or the image processing apparatus 100 may process the input image 10 in conformity to an external print apparatus (not shown) and cause the print apparatus to supply the print output by transmitting the processed result thereto. In the former case, the output unit 108 is a print engine, whereas, in the latter case, the output unit 108 is a piece of hardware, software, or a combination of these two for transmitting the image data to the print apparatus via a communication path. In the below description, although the image processing apparatus 100 is explained by way of example as an apparatus that performs processing for electrophotographic printing using toner as the color material, those having ordinary skill in the art will understand that the present invention similarly applies to an apparatus that employs other color materials.

The input image 10 may be image data having any format, such as bitmap image data or image data described by PDL (page description language). The input image 10 may, for example, be input into the image processing apparatus 100 via a communication path such as a network, or via a portable recording medium such as a CD-R. When the image processing apparatus 100 includes a scanner, data of an image read by the scanner may be used as the input image 10.

The color correction unit 102 performs color correction (or color conversion) with respect to the input image 10 in accordance with a profile. The profile is a set of data including information denoting correlations between color coordinates of grid points in an input color space and color coordinates correlated to those grid points in an output color space. The profile may be, for example, an ICC (International Color Consortium) profile or a profile according to an original standard prescribed by the manufacturer of the image processing apparatus 100.

Here, the output color space is the color space of the output unit 108 in a case where the output unit 108 is a print engine. Alternatively, in a case where the output unit 108 outputs image data to an external print apparatus, the output color space is the color space of the print apparatus. In either case, the output color space is typically expressed by a combination of four colors of C, M, Y, and K. However, it should be noted that the output color space is not limited to those expressed by CMYK, and may be of any type, so long as the color space corresponds to color signals supplied to the output unit 108 (or the print apparatus).

The input color space depends on the type of the profile. For example, according to certain types of profiles (such as an ICC profile), the input color space is a uniform color space of L*a*b, XYZ, or the like. According to other types of profiles, the color space may be that of the apparatus that generates the input image, such as RGB. Further, when a device link profile employed for a print simulation is used, the input color space is the color space (expressed by CMYK or the like) of the target print apparatus simulated by the image processing apparatus 100.

In the case of an ICC profile, as is widely known, there is employed a combination of a source profile expressing the characteristic of an input device that generated the input image 10 and a target profile expressing the characteristic of an output device (in the present example, the output unit 108 or the print apparatus that prints an image output from the output unit 108). In this case, the pair consisting of the source profile and the target profile is considered one profile.

The profile as described above is stored in the profile storage 104. An externally created profile may be registered and used in the profile storage 104.

For each pixel of the input image 10, the color correction unit 102 calculates, according to the profile, color coordinates in the output color space that correspond to a value of the pixel (color coordinates) expressed as color coordinates in the input color space. Here, when the pixel value of the input image 10 matches a grid point expressed in the profile, the output-side color coordinates of the grid point expressed in the profile can simply be used. In other cases, the output-side color coordinates corresponding to the pixel value are calculated by performing interpolation using information of the grid points surrounding the pixel value. Such calculations of color correction are widely known, and further explanations thereof are omitted.

The toner-limiting unit 106 adds adjustments to the image so as to maintain the total toner amount at or below a predetermined limit value. The input image 10 is input into the toner-limiting unit 106 after being subjected to the above-described color correction by the color correction unit 102. For each of the pixels within the input image, the toner-limiting unit 106 calculates the total toner amount of the pixel, and, when the total toner amount exceeds the predetermined limit value, adds adjustments to the pixel value of that pixel. The total toner amount may be calculated as a sum of signal values of respective color components for that pixel. The limit value may be designated as a percentage when the maximum value of one color component is denoted 100%, for example. The value of the limit value may be set by an administrator who manages the image processing apparatus 100. The adjustments to the pixel value may be carried out using the method of under color removal, for example.

In an example case, it is assumed that the limit value of the total toner amount is set to 250%, and the pixel value of a certain pixel is (C, M, Y, K)=(230, 250, 180, 105) (where a color component value of one color is 0-255 (8 bit)). In this case, the total toner amount may be calculated to be 765, by summing the values of C, M, Y, and K. This sum converts into a percentage of 300%, exceeding the limit value. In this situation, when the toner-limiting unit 106 implements an adjustment to reduce the values of C, M, and Y by 65 and to increase the value of K by 65, the total toner amount becomes 635 (249%), which is below the limit value.

It should be noted that all of the total toner amount calculation formula, the manner of expressing the limit value, and the method of pixel value correction described above are simply given by way of example. Any similar types of functions employed in conventional image processing apparatuses may be utilized as the toner-limiting unit 106.

The user interface 112 is a unit that serves to inform a user of a state of the image processing apparatus 100, to receive input of an instruction from a user, and the like. The user interface 112 may include a display device such as a liquid crystal touchscreen and input buttons such as a key pad.

Figure 2:
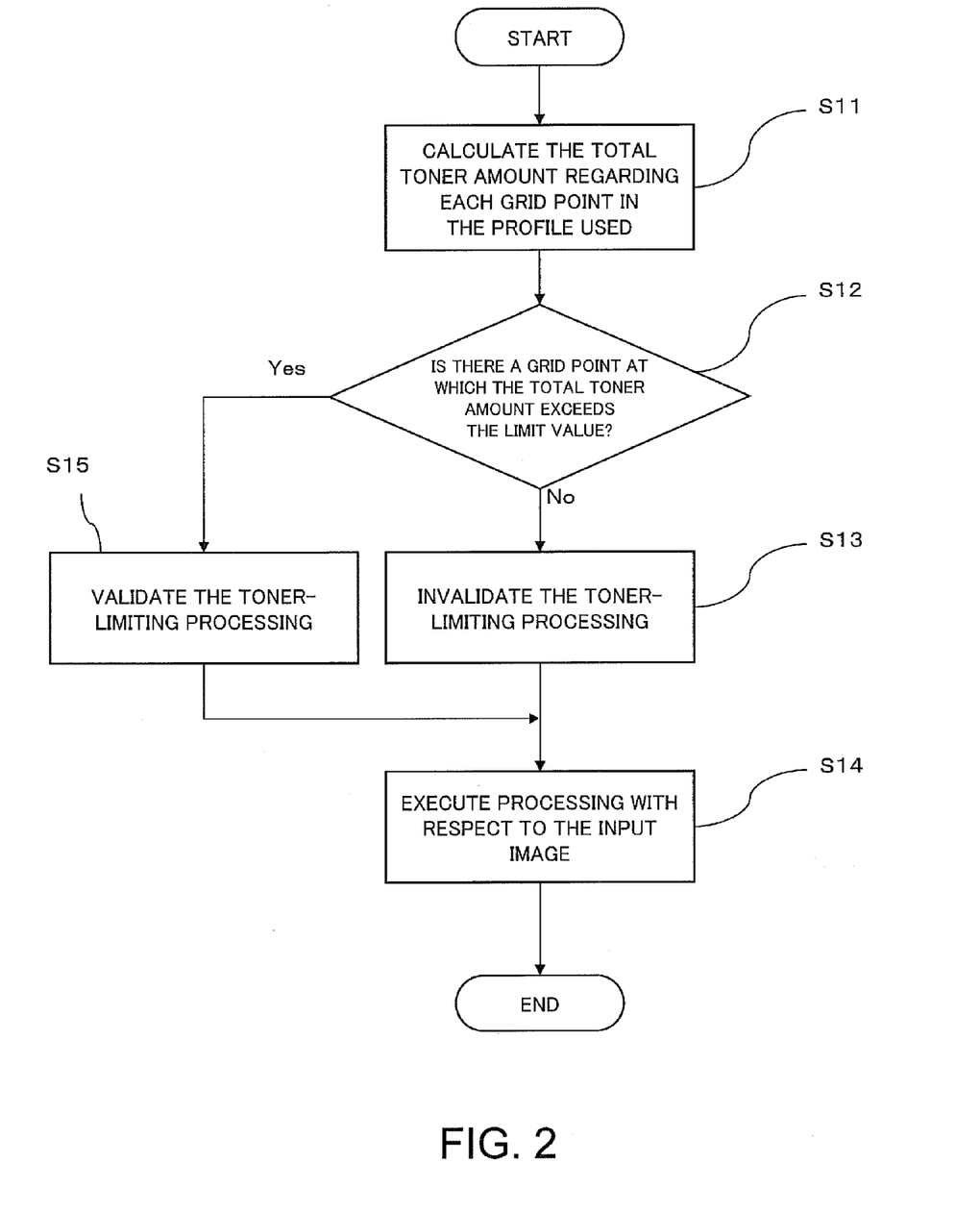
FIG. 2 is a flowchart showing an example procedure for control related to toner limitation.

The controller 110 is a unit that performs overall control of the image processing apparatus 100. Among control operations carried out by the controller 110, control related to the toner-limiting unit 106 is explained in the description below. FIG. 2 shows an example procedure for this control. In this example, as the control related to the toner-limiting unit 106, the controller 110 executes control referring to the profile used by the color correction unit 102.

According to this procedure, when a start of printing of the input image 10 is instructed, the controller 110 calculates, based on the color coordinates (such as a set of C, M, Y, and K) of the grid points in the output color space included in the profile located within the profile storage 104, a total toner amount for each of the grid points (S11). Although there may be cases where multiple profiles are registered within the profile storage 104, it is assumed that the profile to be used is already designated by the user at the time of receipt of the instruction to start printing the input image 10. The controller 110 compares the total toner amounts calculated for the respective grid points with the limit value, and judges whether or not there exists a grid point at which the total toner amount exceeds the limit value (S12). As a result of the judgment, when there exists no grid point at which the total toner amount exceeds the limit value, the controller 110 invalidates the toner-limiting processing by the toner-limiting unit 106 (S13), and then executes processing with respect to the input image 10 (S14). In this case, the input image 10 after being subjected to the color correction by the color correction unit 102 is output from the output unit 108 without being subjected to the image processing for limiting the total toner amount in the toner-limiting unit 106.

On the other hand, when in S12 there exists one or more grid points at which the total toner amount exceeds the limit value, the controller 110 validates (turns ON) the toner-limiting processing by the toner-limiting unit 106 (S15), and then executes processing with respect to the input image 10 (S14). In this case, the input image 10 after being subjected to the color correction by the color correction unit 102 is subjected to the image processing for limiting the total toner amount in the toner-limiting unit 106, and subsequently output from the output unit 108.

During the above-described processing, the controller 110 performs control so as to prevent the output from the color correction unit 102 from being supplied to the toner-limiting unit 106 until when ON/OFF of the toner-limiting unit 106 is decided based on the search referring to the profile.

In the above example, the image adjustment for limiting the total toner amount is invalidated when all of the total color material amounts corresponding to the respective grid points in the profile used for the color correction are no greater than the limit value. This arrangement is used because, when the total color material amounts for all grid points do not exceed the limit value, total color material amounts for points other than the grid points which are obtained by interpolation calculation only exceed the limit value by a slight amount of approximately 1-2%, if any. An overage in this small range would unlikely be a cause of image quality degradation due to excessive toner, and would also unlikely be a cause of malfunctions in the image processing apparatus or hardware of a print apparatus connected thereto. Further, by invalidating the image adjustment for limiting the total toner amount under the above-described condition, unnatural colors and color intensity unevenness which may result from the image adjustment can be avoided or reduced as compared to the case where the image adjustment is carried out.

On the other hand, when there exists one or more grid points at which the total color material amount exceeds the limit value in the above example, by also considering the effects of interpolation calculation and the like, it is recognized that the risk of leading to hardware malfunctions is present, and therefore the image adjustment by the toner-limiting unit 106 is validated.

It should be noted that, when there exists one or more grid points at which the total color material amount exceeds the limit value, instead of validating the image adjustment by the toner-limiting unit 106, it is possible to stop the operation of the output unit 108 and to issue an alarm to the user from the user interface 112. The alarm may be, for example, a warning message displayed on a screen of the user interface 112. The warning message may indicate, for example, that the current profile has the risk of causing apparatus malfunctions. The warning message may also include a text explaining that, while it is possible to avoid such malfunctions by validating the toner-limiting unit 106, this may possibly result in causing color unevenness in the image. Further, in response to the alarm, a selection screen may be presented to the user for inviting the user to select whether to continue the processing for outputting the input image 10 while invalidating the toner-limiting unit 106, whether to continue while validating the toner-limiting unit 106, or whether to cancel the processing for outputting the input image 10, and control operations in accordance with a result selected by the user via the selection screen may subsequently be performed.

Although the above-described example is such that, when the outputting operation of the input image 10 is instructed, the controller 110 checks the data regarding the grid points in the profile so as to judge ON/OFF of the toner-limiting unit 106, this arrangement is simply one example. In an alternative example, at the point when a profile is registered in the profile storage 104, the controller 110 may make judgments in a manner similar to the above example based on the color coordinates of the grid points in the output color space of that profile, and the judgment results may be stored by correlating to that profile. In this case, when the outputting operation of the input image 10 is instructed, the controller 110 performs the ON/OFF control of the toner-limiting unit 106 based on the judgment results stored in correlation to the profile to be used.

A modified example of the above exemplary embodiment is next described by reference to FIGS. 3 and 4. Some image processing apparatuses such as copiers have the function of receiving input of an instruction for adjusting color intensity from a user. In the present modified example, ON/OFF of the toner-limiting unit 106 is controlled in consideration of such a color adjustment instruction from the user.

Figure 3:
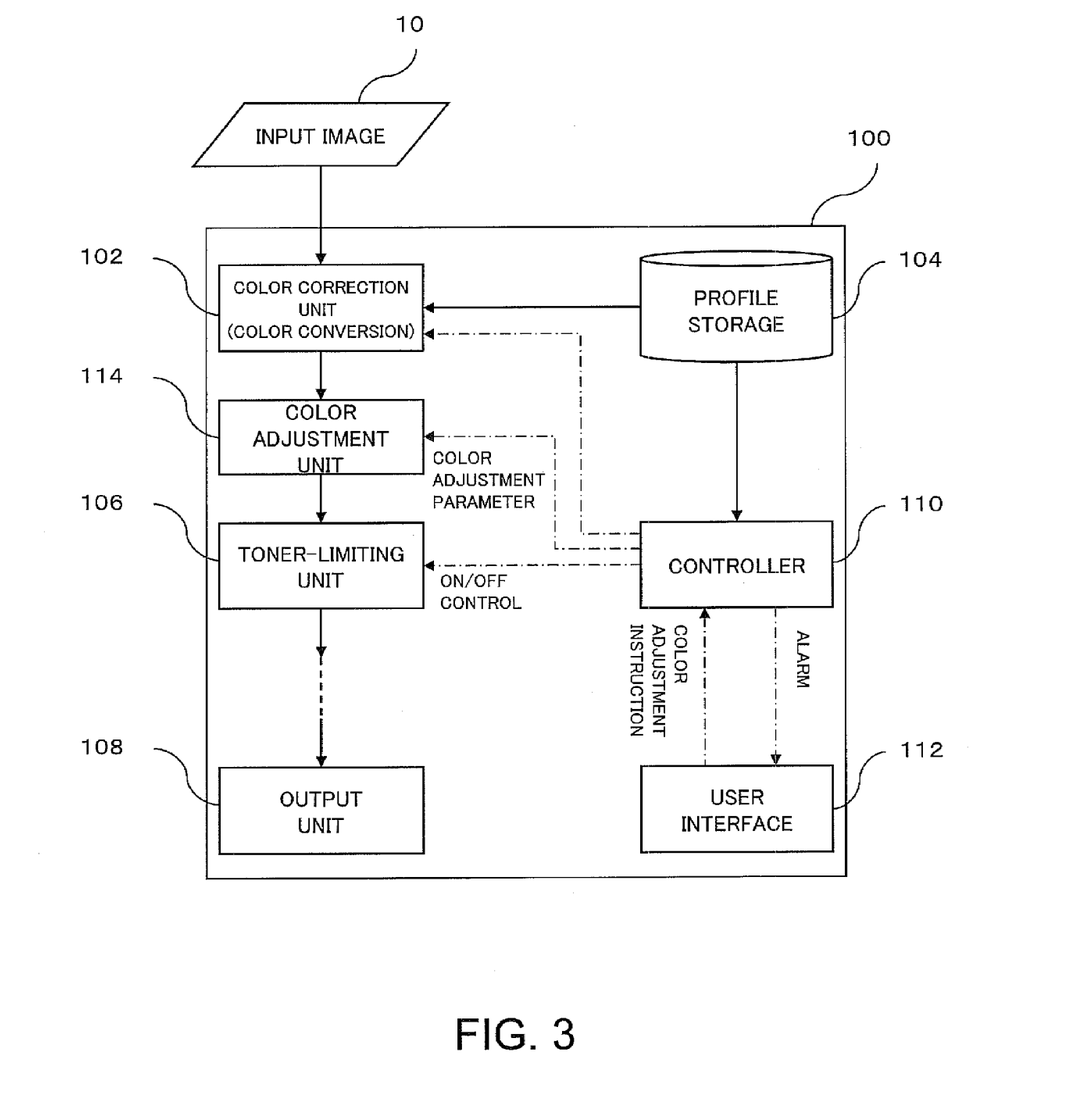
FIG. 3 is a functional block diagram showing an example image processing apparatus according to a modified example.
Figure 4:
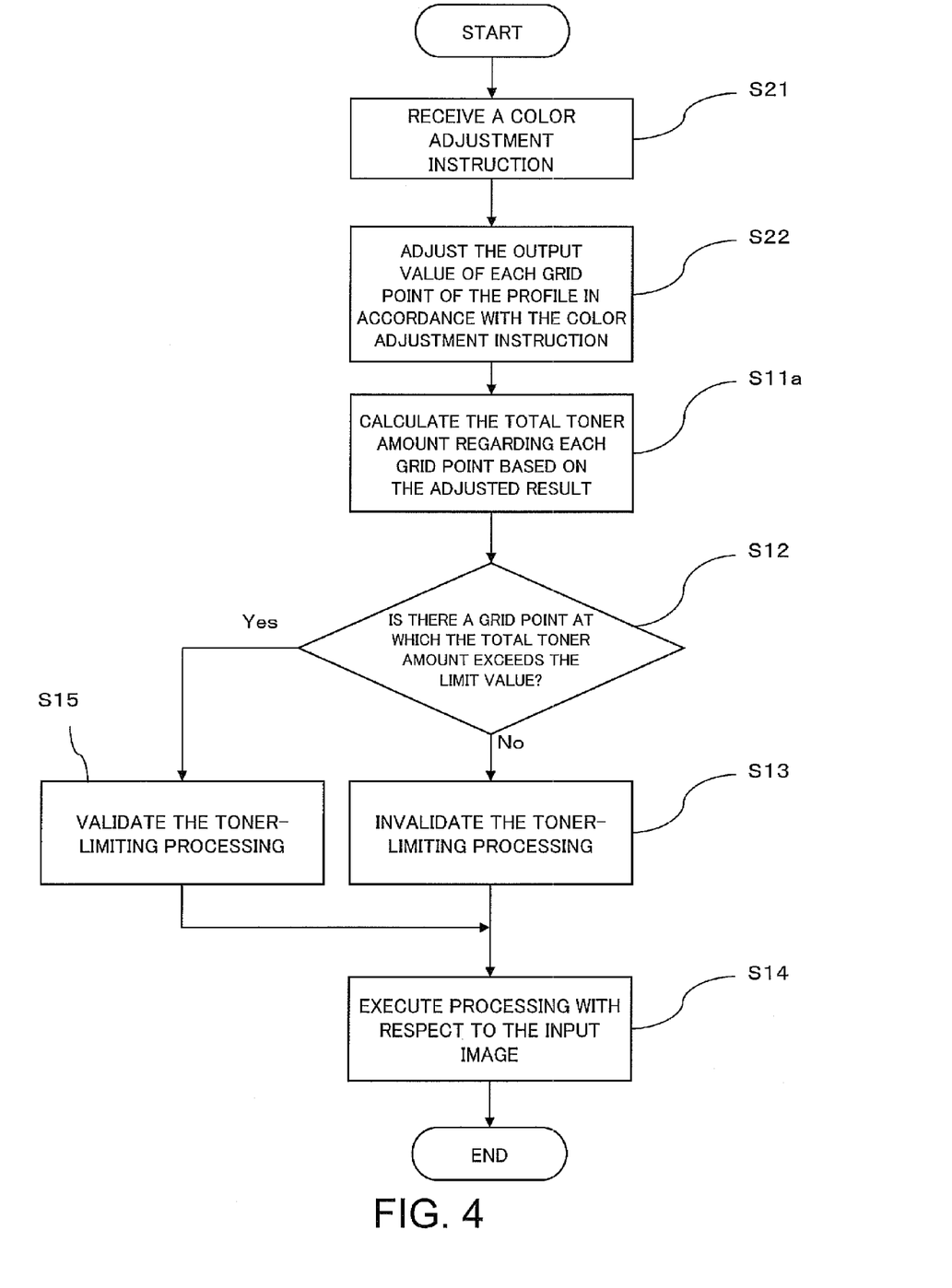
FIG. 4 is a flowchart showing an example procedure for control related to toner limitation in the modified example.

As shown in FIG. 3, the image processing apparatus 100 according to the modified example includes, at a position downstream of the color correction unit 102 and upstream of the toner-limiting unit 106, a color adjustment unit 114 that executes color adjustment based on an instruction from a user. The controller 110 receives input of a color adjustment instruction from a user via a color adjustment instruction input screen presented on the user interface 112. The color adjustment instruction input screen may be, for example, configured to invite the user to designate a gradation of intensity for each of the color components C, M, Y, and K, or the like. Upon receiving a color adjustment instruction from the user via the input screen, the controller 110 inputs into the color adjustment unit 114 a color adjustment parameter in accordance with the instruction. The color adjustment unit 114 executes color adjustments in accordance with the color adjustment parameter with respect to an image which has been subjected to color correction in the color correction unit 102. As the color adjustments executed by the color adjustment unit 114 are known, explanations thereof are omitted herein. An image output from the color adjustment unit 114 is input into the toner-limiting unit 106.

In this modified example, the judgment as to whether to validate or invalidate the toner-limiting unit 106 is made in consideration of the color adjustment executed in the color adjustment unit 114. A procedure for this modified example is shown in FIG. 4. In FIG. 4, steps of performing operations identical to those in FIG. 2 are labeled with the same reference numerals and their repeated explanations are omitted.

In the modified example, when the controller 110 receives a color adjustment instruction from a user (S21), the controller 110 adjusts, in accordance with the color adjustment instruction, the color coordinates of each grid point in the output color space of a profile to be used for the input image 10 (S22). Further, the controller 110 calculates a total toner amount for the respective grid points based on the adjusted color coordinates of those grid points (S11a), and makes the judgment of S12 based on the calculated results.

In the above-described modified example, the judgment regarding ON/OFF of the toner-limiting unit 106 is made in consideration of the color adjustment based on a user's instruction.

In each of the examples described above, the controller 110 reads information regarding the respective grid points in the profile, and makes a judgment based on the read-out results. However, there may be cases where the controller 110 cannot read the information regarding the grid points in the profile. For example, in the Microsoft Windows® operating system, a DLL (Dynamic Link Library) for color conversion is configured so as to be replaceable. DLLs for color conversion are available from various suppliers, and, among such DLLs, there are those that employ a profile having a data format unique to a specific supplier. Accordingly, when a DLL using a profile having a data format other than a format expected by the controller 110 is employed in the color correction unit 102, the controller 110 may be unable to read the information of the respective grid points from the profile. In such a case, the controller 110 may perform a procedure as shown in FIG. 5, for example.

According to this procedure, the controller 110 attempts to read the information of the respective grid points from the profile (S31), and, when the read-out is possible, performs the same processing as in FIG. 2. On the other hand, when the read-out is not possible, the controller 110 inputs color coordinates of the respective grid points in the input color space into the color correction unit 102 and obtains color coordinates of those grid points in the output color space (S32). Subsequently, the operations from step S11 and thereafter are performed based on the color coordinates of the grid points in the output color space obtained in step S32.

Figure 5:
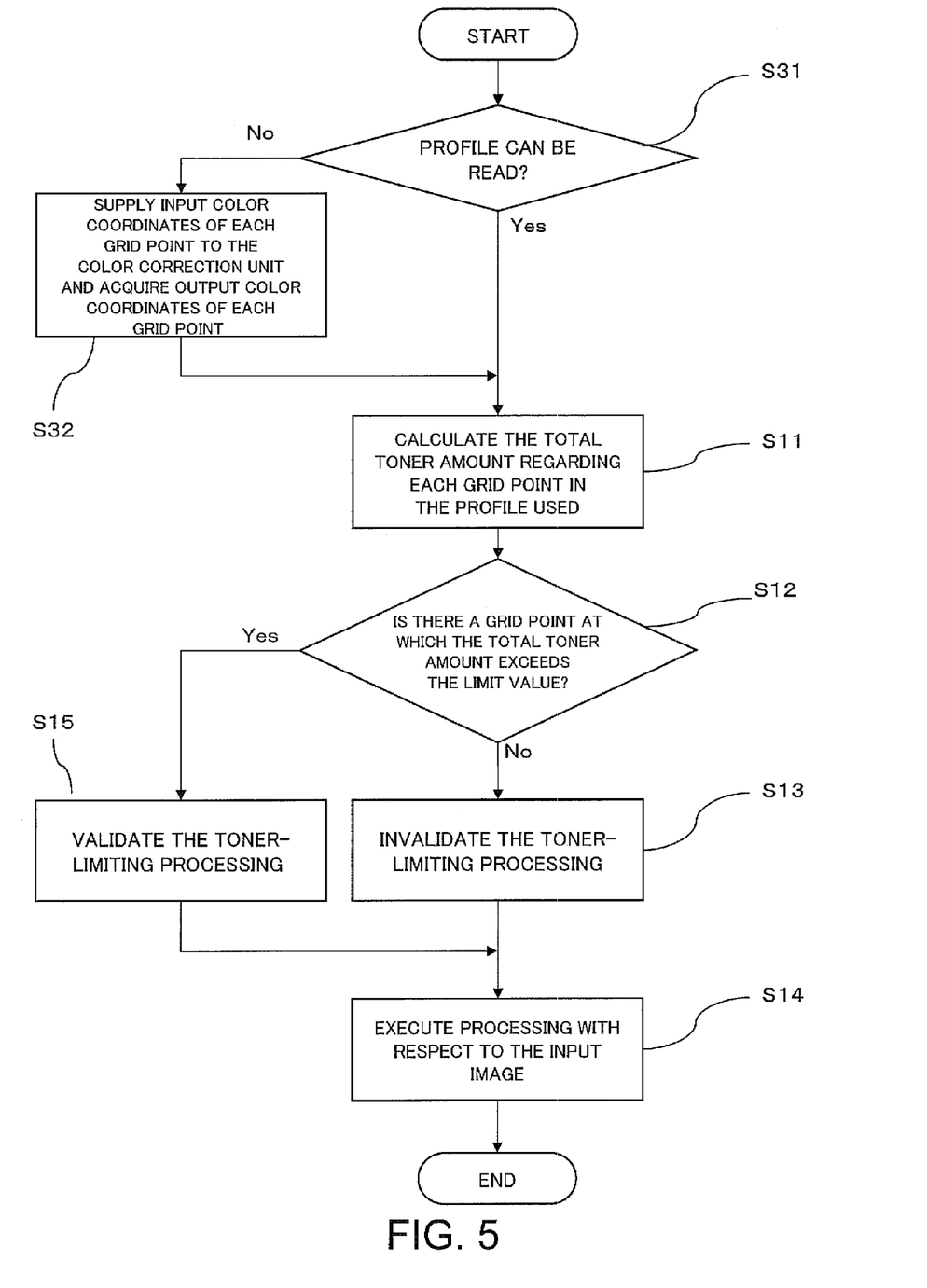
FIG. 5 is a flowchart showing an example procedure for control related to toner limitation when a profile cannot be read.

Although in the example of FIG. 5 the color coordinates of each grid point in the input color space are input into the color correction unit 102 when the information of the grid points in the profile cannot be read, items to be input are not limited to color coordinates of the grid points. It is also possible to input color coordinates of all points in the input color space, obtain output color coordinates for all points, calculate total toner amounts regarding all points, and compare those total toner amounts with a limit value.

Figure 6:
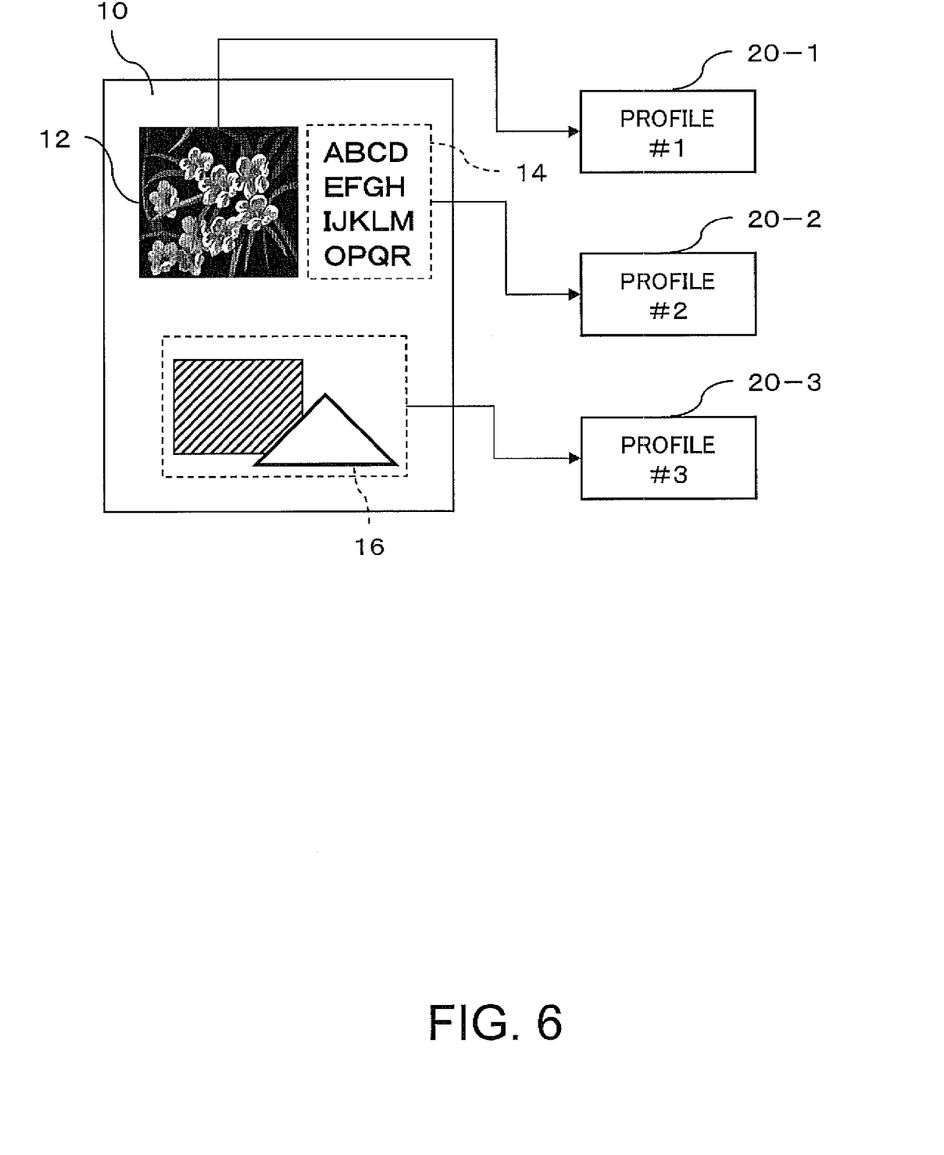
FIG. 6 is a diagram explaining a case in which different profiles are applied to individual regions within an input image.

Further, although in the above-described examples the entire input image 10 is subjected to color correction according to a single profile, some image processing apparatuses have the function of performing color correction using different profiles for different regions within an image. For example, in an image processing apparatus of one type illustrated in FIG. 6, the input image 10 is divided into regions by image types, such as a region 12 of continuous tone image such as a photograph, a text region 14, and a region 16 of diagrams, and color correction is performed with respect to those regions by applying profiles 20-1, 20-2, and 20-3 corresponding to the respective image types. Further, image processing apparatuses of another type have a function of applying a special profile to a region designated by a user within the input image 10, the special profile being different from a profile applied to other regions. In such image processing apparatuses that apply multiple profiles to a single input image 10 for different regions, the controller 110 checks, in steps S11 and S12 of the procedure shown in FIG. 2, the grid points in the respective profiles to be applied to those different regions. In the case where the total color material amount at each of the grid points in these multiple profiles is equal to or below a limit value, the controller 110 invalidates the toner-limiting unit 106, and, when this is not the case, the controller 110 validates the toner-limiting unit 106.

Figure 7:
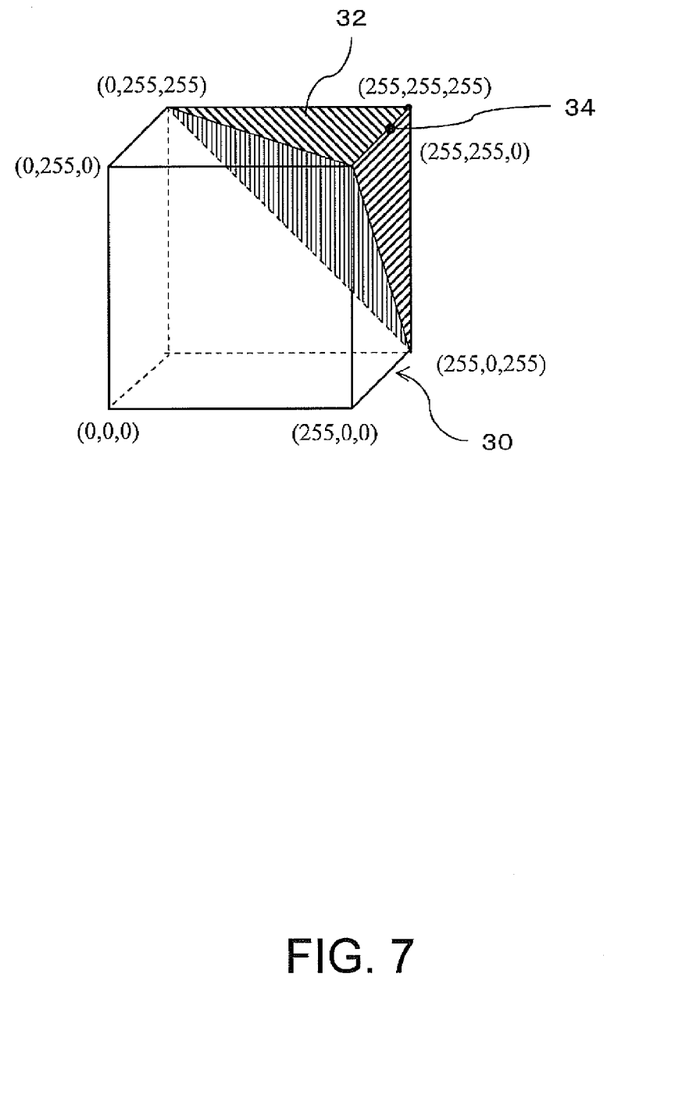
FIG. 7 is a diagram showing an example range of grid points which serve as targets of calculation and judgment of a total toner amount.

Although in the above-described examples all the grid points in a profile to be used for color correction with respect to the input image 10 are judged as to whether or not the total color material amount exceeds the limit value (in steps S11 and S12), this arrangement should be considered to be only an example. For example, a grid point having color component values in the input color space that are all close to zero also has color component values close to zero in the output color space, such that the total toner amount does not exceed the limit value. Accordingly, there may be employed a configuration such that, in steps S11 and S12, the calculation of the total toner amount and the judgment are executed only regarding the grid points in which there are possibilities that the total toner amount would exceed the limit value. In one example, grid points serving as targets of the processing of steps S11 and S12 are limited to those included in a triangular pyramid region 32 having vertices (255, 255, 255), (0, 255, 255), (255, 0, 255), and (255, 255, 0) within an example three-dimensional input color space 30 shown for example in FIG. 7. The triangular pyramid region 32 is the region in which color intensity is relatively higher within the input color space 30, and the possibility that the total toner amount exceeds the limit value is higher in this triangular pyramid region 32 as compared with other regions. Here, for example, when the grid point (255, 255, 255) having the highest color intensity in the input color space 30 and a nearby grid point 34 are compared, the former grid point does not necessarily have a greater total toner amount. Depending on profiles, there may be a case in which black component denoted by K in the former grid point is expressed by a combination of C, M, and Y in the latter grid point, and, in this case, the total toner amount may be greater in the latter grid point. Considering such circumstances, the range of grid points serving as the targets of calculation in steps S11 and S12 are selected to not only include the grid point having the highest color intensity in the input color space 30, but also cover an extent of scope in the proximity of that grid point. It should be noted that the input color space 30 and the target region 32 shown in FIG. 7 are illustrated by way of example only.

Although in the above-described examples the image processing apparatus 100 checks the profile to judge ON/OFF of the toner-limiting unit 106, a part of the checking operation may alternatively be performed by an apparatus external to the image processing apparatus 100.

Figure 8:
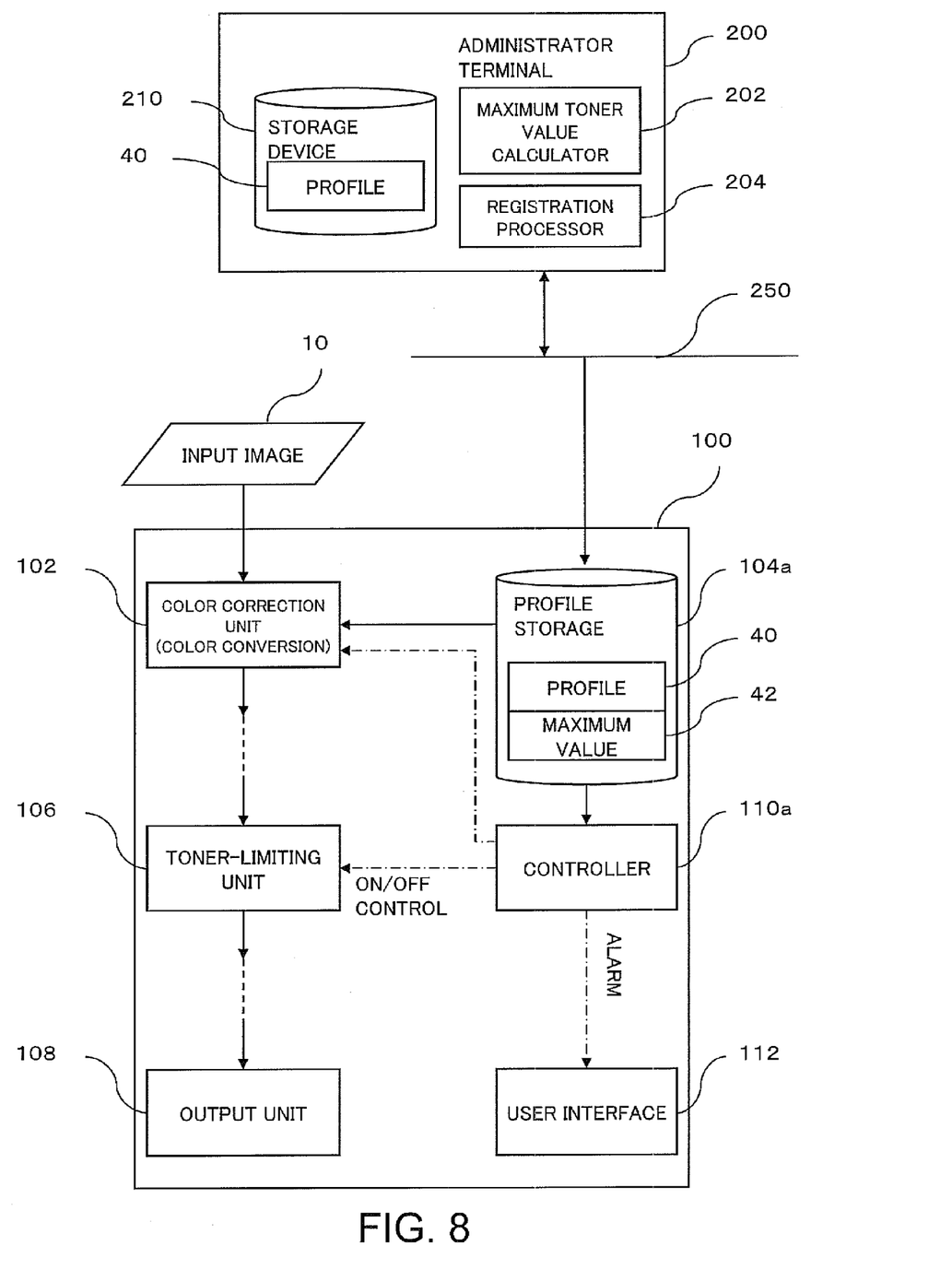
FIG. 8 is a functional block diagram showing an example image processing system according to a modified example.

For example, an installation tool that operates on a computer such as a personal computer may be employed for installing a profile in the image processing apparatus 100. In the example shown in FIG. 8, such a tool is employed in an administrator terminal 200 connected to a LAN 250 to which the image processing apparatus 100 is connected. In the example of FIG. 8, a part of the above-described checking operation is executed in this tool. More specifically, the administrator terminal 200 downloads a profile 40 to be installed in the image processing apparatus 100 from a site on the Internet, for example, and temporarily stores the downloaded profile in a storage device 210. The tool within the administrator terminal 200 includes a maximum toner value calculator 202 and a registration processor 204. The maximum toner value calculator 202 calculates a total toner amount for each of the grid points based on the color coordinates of each grid point in the output color space of the profile 40 designated as the target of installation. The maximum toner value calculator 202 then identifies the maximum value among the calculated total toner amounts for the respective grid points. The registration processor 204 correlates the profile 40 designated as the target of installation with the maximum value 42 identified by the maximum toner value calculator 202, and installs the profile 40 and the correlated maximum value 42 in the image processing apparatus 100. The installed profile 40 and the maximum value 42 correlated thereto are stored in the profile storage 104a of the image processing apparatus 100.

Upon receipt of an instruction for performing output processing of an input image 10, the controller 110a of the image processing apparatus 100 reads out from the profile storage 104a the maximum total toner amount value 42 corresponding to the profile 40 to be used with respect to the input image 10, and compares the maximum value 42 to the limit value of total toner amount. As a result of the comparison, when the maximum value 42 is equal to or below the limit value, the total toner amounts for all the grid points are equal to or below the limit value, such that the controller 110a invalidates the toner-limiting unit 106. On the other hand, when the maximum value 42 exceeds the limit value, the controller 110a validates the toner-limiting unit 106.

In the above examples, the judgment as to whether to invalidate or validate the toner-limiting unit 106 is made based on whether or not all the total toner amounts for the respective grid points are no greater than the limit value. However, even in a case where, for example, the total toner amounts for several grid points exceed the limit value, when the degree of excess is small, the total toner amount may not become great to a degree that would cause malfunctions to the output unit 108 or the print apparatus connected thereto. Accordingly, the condition for invalidating the toner-limiting unit 106 may be described by, for example, a number of grid points at which the total toner amount exceeds the limit value or the degree of such excess, and the controller 110 may judge validation/invalidation of the toner-limiting unit 106 in accordance with that condition.

Figure 9:
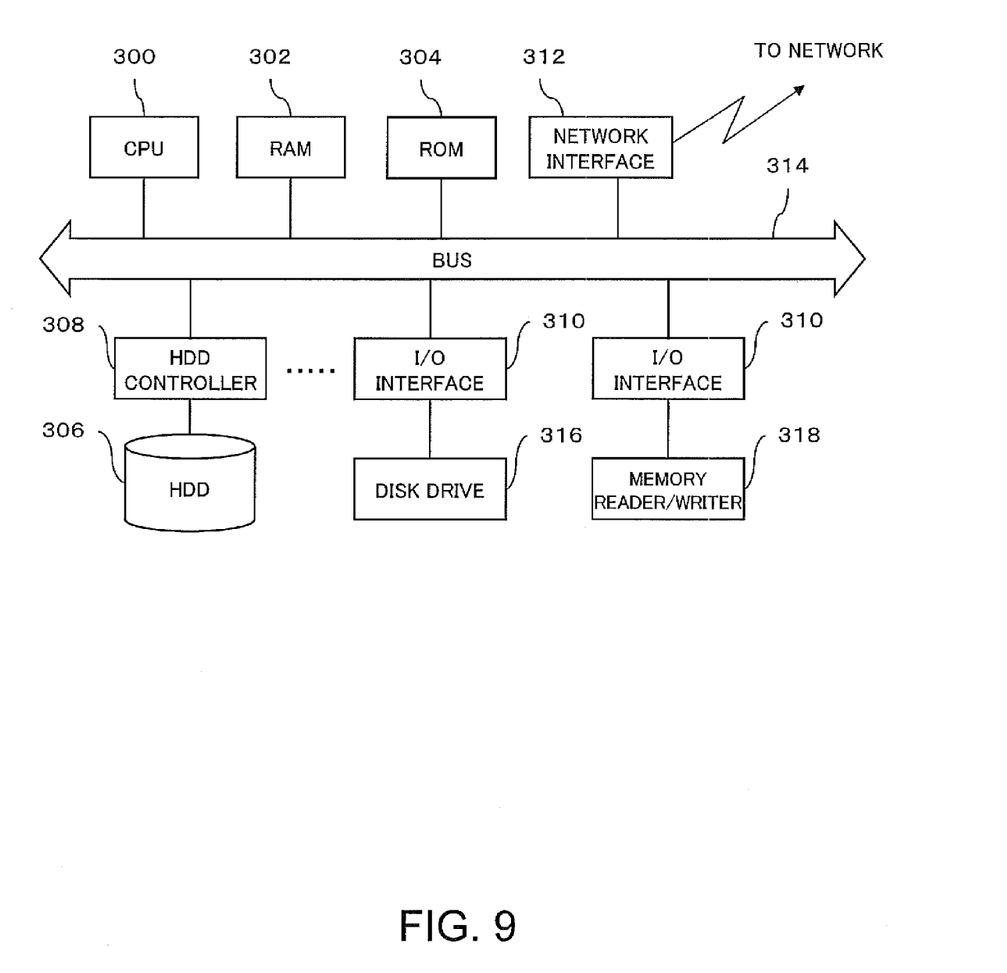
FIG. 9 is a diagram showing an example computer hardware configuration.

The functions of the controller 110, the color correction unit 102, and the toner-limiting unit 106 within the example image processing apparatus 100 described above may be implemented by causing a general-purpose computer to execute a program expressing the processes performed in each of the above-noted example functional modules. Here, for example, the computer as hardware has a circuit configuration in which, as shown in FIG. 9, a microprocessor such as a CPU 300, memory units (primary memory) such as a random access memory (RAM) 302 and a read-only memory (ROM) 304, an HDD controller 308 that controls an HDD (hard disk drive) 306, various I/O (input/output) interface units 310, a network interface 312 that performs control for connection with a network such as a local area network, and the like are connected via a bus 314 or the like. Further, a disk drive 316 for reading and/or writing with respect to portable disk recording media such as CD and DVD, a memory reader/writer 318 for reading and/or writing with respect to portable non-volatile recording media of various standards such as a flash memory, and the like may be connected to the bus 314 via the I/O interface units 310, for example. A program describing the details of the processes performed in each of the above-noted example functional modules is stored in a fixed storage device such as a hard disk drive via a recording medium such as a CD or DVD or via a communication route such as a network, and installed in the image processing apparatus 100. The above-noted example functional modules are realized when the program stored in the fixed storage device is read out into the RAM 302 and executed by a microprocessor such as the CPU 300. A part or all of the functional modules may be configured as hardware circuits such as a special-purpose LSI (large scale integrated circuit), an ASIC (application specific integrated circuit), an FPGA (field programmable gate array), and the like. For example, hardware configurations are suitable for implementing the color correction unit 102 and the toner-limiting unit 106.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An image processing apparatus comprising:
    a conversion unit that performs color conversion of an input image by employing correlation information denoting color coordinates of grid points in an input color space and color coordinates corresponding to those grid points in an output color space and by performing interpolation based on the correlation information regarding color coordinates for points other than the grid points;
    a first adjustment processing unit that performs first adjustment processing with respect to an image output from the conversion unit so as to satisfy a limit value regarding a total color material amount;
    a calculation unit that calculates a total color material amount corresponding to each of the grid points based on the color coordinates of the grid points in the output color space denoted by the correlation information; and
    a judgment unit that judges whether or not the first adjustment processing is to be applied to an image output from the conversion unit based on a comparison between the total color material amount corresponding to each grid point calculated by the calculation unit and the limit value.

2. The image processing apparatus according to claim 1, wherein
    the judgment unit makes a judgment to not apply the first adjustment processing to the image output from the conversion unit when all of the total color material amounts corresponding to the respective grid points calculated by the calculation unit are no greater than the limit value.

3. The image processing apparatus according to claim 1, further comprising:
    a second adjustment processing unit that receives a color adjustment instruction from a user, performs second adjustment processing in accordance with the color adjustment instruction with respect to an image output from the conversion unit, and supplies to the first adjustment processing unit an image which has been subjected to the second adjustment processing; wherein
    the calculation unit applies the second adjustment processing by the second adjustment processing unit to the color coordinates of the gridpoints in the output color space denoted by the correlation information, and, based on a result of this adjustment processing, calculates a total color material amount corresponding to each of the grid points.

4. The image processing apparatus according to claim 1, wherein
    when the color coordinates of the grid points in the output color space denoted by the correlation information cannot be read, the calculation unit inputs the color coordinates of the grid points in the input color space into the conversion unit, and, based on color coordinates of the grid points in the output color space output by the conversion unit as a result, calculates a total color material amount corresponding to each of the grid points; and the judgment unit judges whether or not the first adjustment processing is to be applied to the image output from the conversion unit based on a comparison between the total color material amount corresponding to each grid point calculated by the calculation unit and the limit value.

5. The image processing apparatus according to claim 1, wherein the conversion unit is provided with a plurality of sets of correlation information, and performs color conversion with respect to each region of the input image using a set of correlation information corresponding to that region; and the calculation unit calculates a total color material amount corresponding to each of the grid points in the respective sets of correlation information provided in the conversion unit.

6. The image processing apparatus according to claim 1, wherein the calculation unit calculates the total color material amounts regarding only a predetermined part of grid points among all the grid points included in the correlation information; and the judgment unit judges whether or not the first adjustment processing is to be applied to the image output from the conversion unit based on a comparison between the total color material amount regarding each of the predetermined part of grid points and the limit value.

7. The image processing apparatus according to claim 1, further comprising an alarm unit that issues an alarm to an operator when the total color material amount corresponding to at least one grid point calculated by the calculation unit exceeds the limit value.

8. The image processing apparatus according to claim 1, wherein the judgment unit makes a judgment to apply the first adjustment processing to the image output from the conversion unit when the total color material amount corresponding to at least one grid point calculated by the calculation unit exceeds the limit value.

9. An image processing apparatus comprising:

a conversion unit that performs color conversion of an input image by employing correlation information denoting color coordinates of grid points in an input color space and color coordinates corresponding to those grid points in an output color space and by performing interpolation based on the correlation information regarding color coordinates for points other than the grid points; and an adjustment processing unit that performs adjustment processing with respect to an image output from the conversion unit so as to satisfy a limit value regarding a total color material amount, wherein the adjustment processing unit does not perform the adjustment processing on the image which has been subjected to color conversion by the conversion unit when a total color material amount based on the color coordinates in the output color space corresponding to each grid point in the input color space does not exceed the limit value.

10. An image processing system comprising:

an input apparatus and an image processing apparatus; wherein the input apparatus includes:

a calculation unit that calculates, based on color coordinates of grid points in an output color space given by correlation information denoting color coordinates of grid points in an input color space of the image processing apparatus and color coordinates corresponding to those grid points in an output color space, total color material amounts corresponding to the respective grid points; and an input unit that correlates and inputs, into the image processing apparatus, the correlation information and a maximum value among the total color material amounts corresponding to the respective grid points calculated by the calculation unit, and the image processing apparatus includes:

a receiving unit that receives the correlation information and the maximum value corresponding to the correlation information from the input unit;

a conversion unit that performs color conversion of an input image based on the correlation information received by the receiving unit and by performing interpolation based on the correlation information regarding color coordinates for points other than the grid points;

a first adjustment processing unit that performs first adjustment processing with respect to an image which has been output from the conversion unit so as to satisfy a limit value regarding a total color material amount; and a judgment unit that judges whether or not the first adjustment processing is to be applied to an image output from the conversion unit based on a comparison between the maximum value corresponding to the correlation information received by the receiving unit and the limit value.

11. An image processing apparatus comprising:

a receiving unit that receives correlation information denoting color coordinates of grid points in an input color space and color coordinates corresponding to those grid points in an output color space, and information denoting a total color material amount calculated based on the color coordinates of the grid points in the output color space, while correlating the correlation information and the information denoting the total color material amount;

a conversion unit that performs color conversion of an input image based on the correlation information received by the receiving unit and by performing interpolation based on the correlation information regarding color coordinates for points other than the grid points; and an adjustment processing unit that performs an adjustment processing with respect to an image subjected to conversion by the conversion unit so as to satisfy a limit value regarding a total color material amount, wherein the adjustment processing unit does not perform the adjustment processing when the information denoting the total color material amount received by the receiving unit does not exceed the limit value.

12. An image processing method comprising:

performing color conversion of an input image by employing correlation information denoting color coordinates of grid points in an input color space and color coordinates corresponding to those grid points in an output color space and by performing interpolation based on the correlation information regarding color coordinates for points other than the grid points;

calculating a total color material amount corresponding to each of the grid points based on the color coordinates of the grid points in the output color space denoted by the correlation information;

judging whether or not a first adjustment processing is to be applied to an image output from the color conversion based on a comparison between the calculated total color material amount corresponding to each grid point and a limit value regarding the total color material amount; and when it is judged that the first adjustment processing is to be applied to the image output from the color conversion, performing the first adjustment processing with respect to the image output so as to satisfy the limit value.

13. A computer-readable medium storing a program for causing a computer to execute a process for image processing, the process comprising:

performing color conversion of an input image by employing correlation information denoting color coordinates of grid points in an input color space and color coordinates corresponding to those grid points in an output color space and by performing interpolation based on the correlation information regarding color coordinates for points other than the grid points;

calculating a total color material amount corresponding to each of the grid points based on the color coordinates of the grid points in the output color space denoted by the correlation information;

judging whether or not a first adjustment processing is to be applied to an image output from the color conversion based on a comparison between the calculated total color material amount corresponding to each grid point and a limit value regarding the total color material amount; and when it is judged that the first adjustment processing is to be applied to the image output from the color conversion, performing the first adjustment processing with respect to the image output so as to satisfy the limit value.

* * * * *